US008405869B2

(12) United States Patent
Harigai

(10) Patent No.: US 8,405,869 B2
(45) Date of Patent: Mar. 26, 2013

(54) COLOR CONVERSION DEVICE, INFORMATION PROCESSING METHOD AND COMPUTER READABLE MEDIUM

(75) Inventor: Jungo Harigai, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1024 days.

(21) Appl. No.: 12/073,260

(22) Filed: Mar. 3, 2008

(65) Prior Publication Data

US 2009/0033955 A1    Feb. 5, 2009

(30) Foreign Application Priority Data

Jul. 30, 2007  (JP) ................................. 2007-197748

(51) Int. Cl.
*H04N 1/60* (2006.01)
*H04N 1/46* (2006.01)
*H04N 1/00* (2006.01)

(52) U.S. Cl. .......... 358/1.9; 358/504; 358/401; 358/1.2; 382/275; 382/254; 399/364; 399/374; 399/45

(58) Field of Classification Search ......................... None
See application file for complete search history.

(56) References Cited

U.S. PATENT DOCUMENTS

| | | | | | |
|---|---|---|---|---|---|
| 5,646,744 | A | * | 7/1997 | Knox | 358/401 |
| 5,832,137 | A | * | 11/1998 | Knox | 382/275 |
| 6,101,283 | A | * | 8/2000 | Knox | 382/254 |
| 6,752,481 | B1 | | 6/2004 | Takahashi et al. | |
| 2003/0210414 | A1 | * | 11/2003 | Kuno | 358/1.9 |
| 2006/0256404 | A1 | * | 11/2006 | Yamada | 358/504 |
| 2006/0263126 | A1 | * | 11/2006 | Heydinger et al. | 399/364 |
| 2006/0290959 | A1 | | 12/2006 | Kodama et al. | |
| 2007/0231031 | A1 | * | 10/2007 | Heydinger et al. | 399/374 |
| 2010/0129096 | A1 | * | 5/2010 | DeGruchy | 399/45 |

FOREIGN PATENT DOCUMENTS

| | | |
|---|---|---|
| JP | A-2000-043242 | 2/2000 |
| JP | A-2002-192815 | 7/2002 |
| JP | A-2004-106239 | 4/2004 |
| JP | A-2004-110585 | 4/2004 |
| JP | A-2007-006188 | 1/2007 |

* cited by examiner

*Primary Examiner* — Satwant Singh
(74) *Attorney, Agent, or Firm* — Oliff & Berridge, PLC

(57) ABSTRACT

A color conversion device includes an acquisition section and a correction section. The acquisition section acquires first color information of an image to be printed on a specific position in a first side of a recording paper and second color information of an image to be printed on a position corresponding to the specific position in a second side of the recording paper. The correction section corrects the first color information and second color information acquired by the acquisition section, based on combination information on color combination of images on the corresponding positions of the first side and the second side.

19 Claims, 11 Drawing Sheets

FIG. 6

| | SIDE A | | | | SIDE B | | | | COLORIMETRIC VALUE (SIDE A) | | | COLORIMETRIC VALUE (SIDE B) | | |
|---|---|---|---|---|---|---|---|---|---|---|---|---|---|---|
| | Y | M | C | K | Y | M | C | K | L* | a* | b* | L* | a* | b* |
| 1 | 0 | 0 | 0 | 0 | 0 | 0 | 0 | 0 | 94.02 | −0.41 | 0.21 | 94.53 | −0.34 | 0.04 |
| 2 | 0 | 0 | 0 | 0 | 0 | 0 | 0 | 25 | 93.01 | −0.29 | 0.15 | 73.63 | −0.12 | 0.19 |
| 3 | 0 | 0 | 0 | 0 | 0 | 0 | 0 | 50 | 91.22 | 0.02 | 0.41 | 52.51 | 0.3 | −0.08 |
| 4 | 0 | 0 | 0 | 0 | 0 | 0 | 0 | 75 | 89.72 | 0.05 | 0.14 | 35.58 | 0.12 | −0.07 |
| 5 | 0 | 0 | 0 | 0 | 0 | 0 | 0 | 100 | 88.19 | 0.03 | 0.39 | 21.27 | 0.13 | −0.24 |
| .. | .. | .. | .. | .. | .. | .. | .. | .. | .. | .. | .. | .. | .. | .. |

FIG. 8

| | SIDE A | | | | SIDE B | | | | CORRECTION VALUE OF SIDE A | | | | CORRECTION VALUE OF SIDE B | | | |
|---|---|---|---|---|---|---|---|---|---|---|---|---|---|---|---|---|
| | Y | M | C | K | Y | M | C | K | Y | M | C | K | Y | M | C | K |
| 1 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 12.5 | 0 | 0 | 0 | 0 | 0 | 0 | 0 | 14 |
| 3 | 0 | 0 | 0 | 0 | 0 | 0 | 0 | 25 | 0 | 0 | 0 | 0 | 0 | 0 | 0 | 28 |
| 4 | 0 | 0 | 0 | 0 | 0 | 0 | 0 | 37.5 | 0 | 0 | 0 | 0 | 0 | 0 | 0 | 40 |
| 5 | 0 | 0 | 0 | 0 | 0 | 0 | 0 | 50 | 0 | 0 | 0 | 0 | 0 | 0 | 0 | 55 |
| .. | .. | .. | .. | .. | .. | .. | .. | .. | .. | .. | .. | .. | .. | .. | .. | .. |
| $9^8-1$ | 100 | 100 | 100 | 100 | 100 | 100 | 100 | 87.5 | 90 | 95 | 100 | 100 | 88 | 92 | 99 | 90 |
| $9^8$ | 100 | 100 | 100 | 100 | 100 | 100 | 100 | 100 | 95 | 96 | 100 | 100 | 93 | 96 | 100 | 99 |

FIG. 9

| COLOR CORRECTION PATCH | SIDE A (CORRECTION TARGET) | | | | SIDE B (NON-CORRECTION TARGET) | | | | COLORIMETRIC VALUE (SIDE A) | | |
|---|---|---|---|---|---|---|---|---|---|---|---|
| | Y | M | C | K | Y | M | C | K | L* | a* | b* |
| 1 | 0 | 0 | 0 | 0 | 0 | 0 | 0 | 0 | 95.02 | −0.41 | 0.21 |
| 2 | 0 | 0 | 0 | 0 | 0 | 0 | 0 | 25 | 93.01 | −0.29 | 0.15 |
| 3 | 0 | 0 | 0 | 0 | 0 | 0 | 0 | 50 | 91.22 | 0.02 | 0.41 |
| 4 | 0 | 0 | 0 | 0 | 0 | 0 | 0 | 75 | 89.72 | 0.05 | 0.14 |
| 5 | 0 | 0 | 0 | 0 | 0 | 0 | 0 | 100 | 88.19 | 0.03 | 0.39 |
| .. | .. | .. | .. | .. | .. | .. | .. | .. | .. | .. | .. |
| $5^8-1$ | 100 | 100 | 100 | 100 | 100 | 100 | 100 | 75 | 15.02 | −0.54 | −0.77 |
| $5^8$ | 100 | 100 | 100 | 100 | 100 | 100 | 100 | 100 | 14.78 | 1.03 | −2.38 |

COLOR CONVERSION DEVICE, INFORMATION PROCESSING METHOD AND COMPUTER READABLE MEDIUM

CROSS-REFERENCE TO RELATED APPLICATIONS

This application is based on and claims priority under 35 USC 119 from Japanese Patent Application No. 2007-197748 filed Jul. 30, 2007.

BACKGROUND

1. Technical Field

The present invention relates to a color conversion device, an information processing method and a computer readable medium.

2. Related Art

Recently, color devices such as digital cameras, color scanners, color printers, and color displays have come into wide use, thereby increasing a demand for color in the market. Particularly, a demand for systems used for DTP (Desktop Publishing) or the like is high.

However, there is a problem on a so-called show-through effect that an image on the back side is shown to the front side at the time of both-side printing. That is, colors of a printed image become different from colors of an intended image due to the show-through effect. Particularly, although a printer mostly performs both-side printing, a printer performing color correction with information of the show-through effect has not been generalized yet.

There was proposed an information processor for performing correction according to a user's taste without influence of a show-through effect at the time of both-side printing.

SUMMARY

According to an aspect of the invention, a color conversion device includes an acquisition section and a correction section. The acquisition section acquires first color information of an image to be printed on a specific position in a first side of a recording paper and second color information of an image to be printed on a position corresponding to the specific position in a second side of the recording paper. The correction section corrects the first color information and second color information acquired by the acquisition section, based on combination information on color combination of images on the corresponding positions of the first side and the second side.

BRIEF DESCRIPTION OF THE DRAWINGS

Exemplary embodiments of the present invention will be described in detail with reference to the accompanying drawings, wherein:

FIG. 6 is a diagram illustrating an example of a calorimetric data used as reference in a first operation example of a color correction unit according to the exemplary embodiment of the invention.

FIG. 8 is a diagram illustrating a DLUT used as reference in the first operation example of the color correction unit according to the exemplary embodiment of the invention.

FIG. 9 is a diagram illustrating a colorimetric data used as reference a second operation example of the color correction unit according to the exemplary embodiment of the invention.

DETAILED DESCRIPTION

Hereinafter, the best mode (hereinafter, referred to as "embodiment") for carrying out the invention will be described in detail with reference to the drawings.

Figure 1:
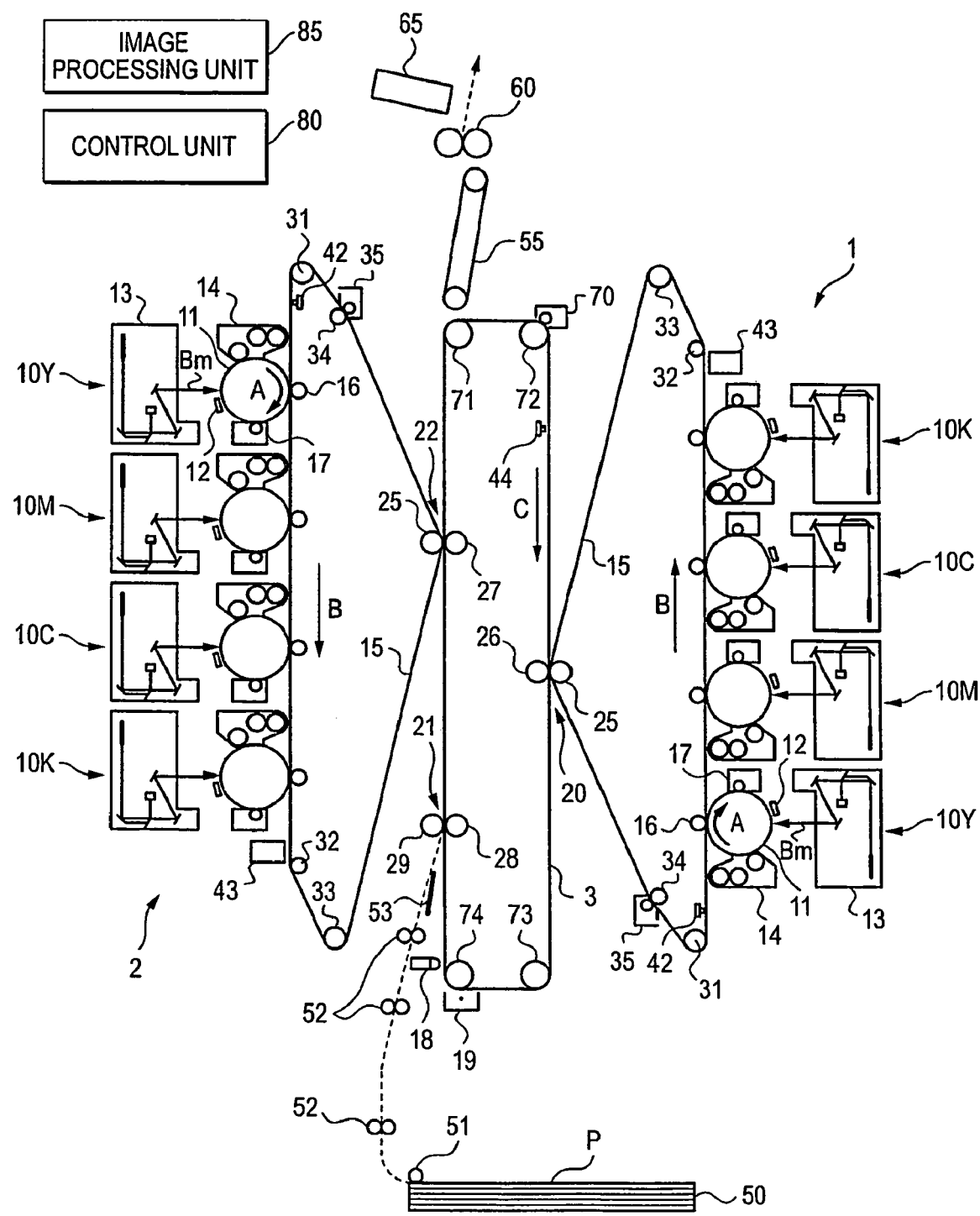
FIG. 1 is a diagram illustrating an image forming apparatus to which an exemplary embodiment of the invention is applied.

FIG. 1 is a diagram illustrating an image forming apparatus to which the embodiment is applied. The image forming apparatus shown in FIG. 1 includes a first image forming portion 1 and a second image forming portion 2 disposed on both sides with a conveyor belt 3 interposed therebetween. The first image forming portion 1 and the second image forming portion 2 are similarly an image forming module using a so-called intermediate transfer method. Each of the first image forming portion 1 and the second image forming portion 2 includes a plurality of image forming units 10 (10Y, 10M, 10C, and 10K) forming a toner image of each color component using electrophotography and includes an intermediate transfer belt 15. The toner image of each color component formed by each image forming unit 10 is sequentially transferred (first transference) to the intermediate transfer belt 15 and is kept on the intermediate transfer belt 15. Each of the first image forming portion 1 and the second image forming portion 2 forms an overlapping toner image on the intermediate transfer belt 15. The conveyor belt 3 keeps and conveys the overlapping toner image formed on the intermediate transfer belt 15 of the first image forming portion 1, and the conveyor belt 3 keeps and conveys a paper P that is a recording material (transfer sheet) close to the second image forming portion 2. The image forming apparatus further includes a fusing unit 60 that fixes the toner image on the paper P, a colorimetric sensor 65 that sums up the amount of characteristics about colors in the toner image fixed on the paper P, a control unit 80 that controls an operation of each device (portion, unit), and an image processing unit 85 that performs a predetermined image process on an input image data.

In the present embodiment, the first image forming portion 1 and the second image forming portion 2 have the same configuration except disposition directions, and thus the first image forming portion 1 will be described as an example. Each image forming unit 10Y, 10M, 10C, and 10K of the first image forming portion 1 has electrophotography devices sequentially disposed around a photoreceptor drum 11 rotating in a direction indicated by an arrow A, such as a charging device 12 that charges the photoreceptor drum 11, a laser exposing device 13 (an exposing beam is represented by reference numeral Bm) that forms an electrostatic latent image on the photoreceptor drum 11, a developing device 14 that contains a toner for each color component and develops the electrostatic latent image formed on the photoreceptor drum 11 into a visible image using the toner, a first transfer rollers 16 that transfer the toner image of each color component formed on the photoreceptor drum 11 to the intermediate transfer belt 15, and a drum cleaner 17 that removes a toner remaining on the photoreceptor drum 11. The image forming unit 10Y (Y, Yellow), 10M (M, Magenta), 10C (C, Cyan), and 10B (B, Black) are disposed on a substantially straight line in order from the upstream side of the intermediate transfer belt 15.

The intermediate transfer belt 15 that is an intermediate transfer member made of resin such as polyimide or polyamide that appropriately contains conductive agent such as carbon black. The intermediate transfer belt 15 has volume resistivity of $10^6$ to $10^{14}$ Ωcm and is formed of a film-shaped endless belt having a thickness of about 0.1 mm, and the like. The intermediate transfer belt 15 is circularly driven (rotated) by various kinds of rollers in a direction indicated by an arrow B shown in FIG. 1 at a predetermined rate. These various kinds of rollers include a driving roller 31 that is driven by a motor (not shown) excellent in constant rate and circularly drives the intermediate transfer belt 15, a support roller 32 that supports the intermediate transfer belt 15 stretched on a substantially straight line along the arrangement direction of the photoreceptors 11, a tension roller 33 that applies regular tension to the intermediate transfer belt 15 and serves as a correction roller to prevent the intermediate transfer belt 15 from meandering, a backup roller 25 that is disposed in a first transfer portion 20, and a cleaning backup roller 34 that is disposed in a cleaning portion for raking out the toner remaining on the intermediate transfer belt 14.

The first transfer rollers 16 are opposed to the photoreceptor drums 11 and are disposed within the intermediate transfer belt 15 stretched on a substantially straight line. A voltage with a polarity (plus polarity) opposite to a charging polarity (hereinafter, minus polarity) of the toner is applied to the first transfer rollers 16. Accordingly, the toner images on the photoreceptor drums 11 are sequentially electrostatically transferred to the intermediate transfer belt 15, and thus the overlapping toner image is formed on the intermediate transfer belt 15.

A belt cleaner 35 is detachably provided on the downstream side of the first transfer portion 20 of the intermediate transfer belt 15. The belt cleaner 35 removes the toner remaining on the intermediate transfer belt 15 or pieces of paper and cleans the surface of the intermediate transfer belt 15. A reference sensor (home position sensor) 42 is disposed on the upstream side of the yellow image forming unit 10Y. The reference sensor 42 generates a reference signal to estimate an image forming timing in each image forming units 10Y, 10M, 10C, and 10K. An image density sensor 43 to control quality of image is disposed on the downstream side of the black image forming unit 10K. The reference sensor 42 recognizes a predetermined mark formed on the back side of the intermediate transfer belt 15 to generate the reference signals. The image forming units 10Y, 10M, 10C, and 10K start the image formation under the instructions from the control units 80 based on the recognition of the reference signals.

The conveyor belt 3 is interposed between the first image forming portion 1 and the second image forming portion 2. The conveyor belt 3 comes into contact with the first transfer portion 20 of the first image forming portion 1 and comes into contact with a third transfer portion 22 of the second image forming portion 2. The conveyor belt 3 is circularly driven (rotated) in a direction indicated by an arrow C in FIG. 1 by various kinds of rollers at the same speed as the intermediate transfer belt 15 of the first image forming portion 1 and the intermediate transfer belt 15 of the second image forming portion 2.

These various kinds of rollers include a driving roller 71 that is driven by a motor (not shown) excellent in constant rate and circularly drives the conveyor belt 3, a cleaning backup roller 72 opposed to a belt cleaner 70 for raking out the toner remaining on the conveyor belt 3, a tension roller 73 that applies regular tension to the conveyor belt 3 and serves as a correction roller to prevent the conveyor belt 3 from meandering, and a support roller 74 that supports the conveyor belt 3.

In the conveyor belt 3, the first transfer portion 20 denotes a part where the toner image on the intermediate transfer belt 15 of the first image forming portion 1 is transferred to the conveyor belt 3, the second transfer portion 21 denotes a part where the toner image transferred to the conveyor belt 3 is transferred to the paper P, and the third transfer portion 22 denotes a part where the toner image on the intermediate transfer belt 15 of the second image forming portion 2 is transferred to the paper P, along the conveying direction of the conveyor belt 3.

In the conveyor belt 3, a corona discharging device 19 is disposed between the first transfer portion 20 and the second transfer portion 21. The corona discharging device 19 discharges plus charges so that a toner charging polarity of the toner image transferred to the first transfer portion 20 is charged into the opposite polarity. A charge erase lamp 18 is disposed close to the corona discharging device 19 on the downstream side of the conveying direction of the conveyor belt 3, so as to emit light onto the surface of the conveyor belt 3. The charge erase lamp 18 includes an LED, a halogen lamp, a xenon lamp, and the like. The charge erase lamp 18 emits light having a wavelength of 500 to 900 nm.

In the conveyor belt 3, a reference sensor (home position sensor) 44 is disposed on the upstream side of the first transfer portion 20. The reference sensor 44 generates a reference signal to estimate a conveying timing of the conveyor belt 3. The reference sensor 44 recognizes a predetermined mark formed on the back side of the conveyor belt 3 to generate the reference signals. The image formation in the first image forming portion 1 and the second image forming portion 2 is started and the paper P is conveyed to the second transfer portion 21, under the instructions from the control units 80 based on the recognition of the reference signals.

In the exemplary embodiment, a paper conveying system includes a paper tray 50 that stores the paper P, a pickup roller 51 that picks up and conveys the paper P piled up in the paper tray 50 at a predetermined timing, a conveyor roller 52 that conveys the paper P conveyed by the pickup roller 51, a conveyor chute 53 that guides the paper P conveyed by the conveyor roller 52 to the second transfer portion 21, and a conveyor belt 55 that conveys the paper P, which is passed through the third transfer portion 22 by the conveyor belt 3, to the fusing unit 60.

A basic image forming process of the image forming apparatus according to the exemplary embodiment will be described below. A front-side image data and a back-side image data of image data outputted from an image reading device (not shown) or a personal computer (PC) (not shown) are sequentially inputted to the image forming apparatus as shown in FIG. 1. In the image forming apparatus, a predetermined image process is performed in the image processing unit 85 and then the first image forming portion 1 forms an image about the back-side image data using the image forming units 10Y, 10M, 10C, 10B and the like. In the image processing unit 85, predetermined image processes are performed, for example, a shading correction, a deviating position correction, a brightness/color space conversion, a gamma correction, a frame erasure, and various kinds of image edits such as a color edit and a movement edit, with respect to the input reflection data. The image-processed image data are converted into color gradation data of four colors of Y, M, C, and K, and the converted data are outputted to the laser exposing device 13.

In the laser exposing device 13, for example, an exposing beam Bm coming from a semiconductor laser is emitted to each of the photoreceptor drums 11 of the image forming unit 10Y, 10M, 10C, and 10K, according to the input color material gradation data. In the photoreceptor drums 11 of the image forming units 10Y, 10M, 10C, and 10K, the surfaces thereof is charged by the charging device 12 and then the surface are scanned and exposed by the laser exposing device 13, thereby forming an electrostatic latent image. The formed electrostatic latent image is developed into a toner image of colors of Y, M, C, and K in the image forming units 10Y, 10M, 10C, and 10K.

The toner image formed on the photoreceptor drums 11 of the image forming units 10Y, 10M, 10C, and 10K is transferred to the intermediate transfer belt 15 in the first transfer portion in which the photoreceptor drums 11 and the intermediate transfer belt 15 come into contact with each other. More specifically, in the first transfer portion, a voltage with a polarity (plus polarity) opposite to the charging polarity (minus polarity) of the toner is applied to the intermediate transfer belt 15 in the first transfer roller 16, the non-fixed toner image sequentially overlaps with the surface of the intermediate transfer belt 15, and thus the first transfer is performed. In such a manner, the first transferred toner image on the back-side image is conveyed to the first transfer portion 20 according to the rotation of the intermediate transfer belt 15.

In the first transfer portion 20, the first transfer roller 26 is pressed against the backup roller 25 with the conveyor belt 3 and the intermediate transfer belt 15 interposed therebetween. In this case, when the voltage (transfer bias) with the polarity (plus polarity) opposite to the charging polarity (minus polarity) of the toner is applied to the first transfer roller 26, transfer electric field is formed between the first transfer roller 26 and the backup roller 25, and the toner image kept on the intermediate transfer belt 15 is electrostatically transferred to the conveyor belt 3.

Then, the conveyor belt 3 to which the toner image is transferred is conveyed to the region where the corona discharging device 19 is disposed. The toner image is charged into a polarity opposite to the charging polarity by the corona discharging device 19. Specifically, the corona discharging device 19 performs plus corona discharge to the conveyor belt 3 to charge the toner image into a plus polarity.

The conveyor belt 3 charged into the plus polarity by the corona discharging device 19 is conveyed to the region where the charge erase lamp 18 is disposed, and then the charge erase lamp 18 irradiates the conveyor belt 3. Charges of a photosensitive layer provided on the surface of the conveyor belt 3 are removed by the light irradiation of the charge erase lamp 18, and thus electric potential thereof is decreased to about 0 V. The charges of the toner image on the conveyor belt 3 is not removed in spite of the light irradiation of the charge erase lamp 18 and is kept in a state having plus charges.

The conveyor belt 3 keeping the toner image charged into the plus polarity is conveyed to the second transfer portion 21. At this time, in the paper conveying system, the pickup roller 51 is rotated according to the conveying timing of the conveyor belt 3 to feed a paper P with a predetermined size from the paper tray 50. The paper P fed by the pickup roller 51 is conveyed by the conveyor roller 52, passes through the conveyor chute 53, and reaches the second transfer portion 21. Before reaching the second transfer portion 21, the paper P stops once, and then the position of the paper P and the position of the toner image are matched with each other by rotating a resist roller (not shown) according to the conveying timing of the conveyor belt 3 keeping the toner image.

In the second transfer portion 21, the second transfer roller 28 is pressed against the backup roller 29 with the conveyor belt 3 and the paper P interposed therebetween. At this time, when a voltage (transfer bias) with the same polarity (plus polarity) as the charging polarity (plus polarity) of the toner is applied to the second transfer roller 28, transfer electric field is formed between the second transfer roller 28 and the backup roller 29 and the toner image kept on the conveyor belt 3 is electrostatically transferred to the back side of the paper P.

The paper P to which the toner image is transferred is electrostatically transferred onto the conveyor belt 3 due to the charges supplied by the second transfer roller 28 and the paper P is conveyed to the third transfer portion 22.

Meanwhile, in the second image forming portion 2, the image formation is performed by the image forming units 10Y, 10M, 10C, 10B about the front-side image data according to the conveying timing of the paper P in the conveyor belt 3. Passing through the same process as the image formation process about the back-side image data in the first image forming portion 1, an overlapping toner image about the front-side image is formed on the surface of the intermediate transfer belt 15 of the second image forming portion 2. The toner image kept on the intermediate transfer belt 15 is conveyed to the third transfer portion 22 according to the conveying timing of the paper P on the convey belt 3.

In the third transfer portion 22, the third transfer roller 27 is pressed against the backup roller 25 with conveyor belt 3, the paper P, and the intermediate transfer belt 15 interposed therebetween. At this time, when a voltage (transfer bias) with a polarity (plus polarity) opposite to the charging polarity (minus polarity) of the toner is applied to the third transfer roller 27, transfer electric field is formed between the third transfer roller 27 and the backup roller 25 and the toner image kept on the intermediate transfer belt 15 is electrostatically transferred to the front side of the paper P.

In this case, the toner image transferred at the second transfer portion 21 is kept on the back side of the paper P. However, since the toner image kept on the back side of the paper P is charged with the plus charges, the toner image is not scattered and the amount of charges is not decreased due to the plus transfer bias applied by the third transfer roller 27. That is, an electrostatic force acts on the toner image with the plus charges kept on the back side of the paper P in a direction from the third transfer roller 27 to the paper P and the plus charges are supplied thereto. Accordingly, as charge density of the toner image increases, the absorption force to the paper P increases.

The paper P passing through the third transfer portion 22 and having the toner images transferred to front and back sides thereof is conveyed while being electrically transferred to the convey belt 3, the paper P is separated from the conveyor belt 3 curved in the vicinity of the driving roller 71. The paper P separated from the conveyor belt 3 is conveyed to the conveyor belt 55 disposed on the downstream side of the paper conveying direction of the conveyor belt 3. In the conveyor belt 55, the paper P is conveyed to the fusing unit 60 according to the optimized conveying speed of the fusing unit 60. In this case, the conveyor belt 55 is made of conductive materials, and a plus voltage is applied to the conveyor belt 55 by a power supply (not shown). Accordingly, the toner image kept on the back side of the paper P is attached to the conveyor belt 55 to prevent confusion in image.

The non-fixed toner image on the paper P conveyed to the fusing unit 60 is subjected to a fixing treatment with heat and pressure by the fusing unit 60 and thus the toner image is fixed on the paper P. The paper P having the fixed image formed thereon is discharged to the outside of the image forming apparatus by a discharge roller (not shown). At this time, the image fixed on the paper P is sensed by the colorimetric sensor 65, and then a data on the amount of characteristics about colors such as brightness, chroma, and tone is transmitted to the control unit 80. After the both-side transfer to the paper P is completed, the toner remaining on the conveyor belt 3 is conveyed to the belt cleaner 70 by rotating the transfer belt 3 and removed from the conveyor belt 3 by the cleaning backup roller 72 and the belt cleaner 70.

When forming both-side images using such an image forming apparatus, color conversion is performed in consideration of influence of a show-through effect in the exemplary embodiment. For example, when the color conversion is performed by reflecting the influence of the show-through effect to one side (hereinafter, referred to as side A) from the other side (hereinafter, referred to as side B), the corrected color of the side B has an influence on the side A. In the exemplary embodiment, the images on the side A and the side B are collectively processed to solve the problem. For example, an RIP (Raster Image Processor) that collectively rasterizes both sides is provided to perform the color correction of the both-side images.

As the color correction, the following color conversion is performed specifically. For example, in a printer that represent colors using three colors of cyan (C), magenta (M), and yellow (Y), the corresponding pixels on both sides are subjected to both-side collective color conversion of CMY1 (CMY2)→Lab1(Lab2)→CMY1'(CMY2'). In addition, in a printer that represent colors using four colors of cyan (C), magenta (M), yellow (Y), and black (K), the corresponding pixels on both sides are subjected to both-side collective color conversion of CMYK1(CMYK2)→Lab1(Lab2)→CMYK1' (CMYK2'). In the present specification, combination of a color data α of the side A and a color data β of the side B is represented by "α(β)". In the above description, Lab1 and Lab2 denote color data in which target colors to be printed on the side A and the side B are represented by the use of device-independent L*a*b* space.

Next, an operation at the time of color correction in the image forming apparatus in the exemplary embodiment will be described.

Figure 2:
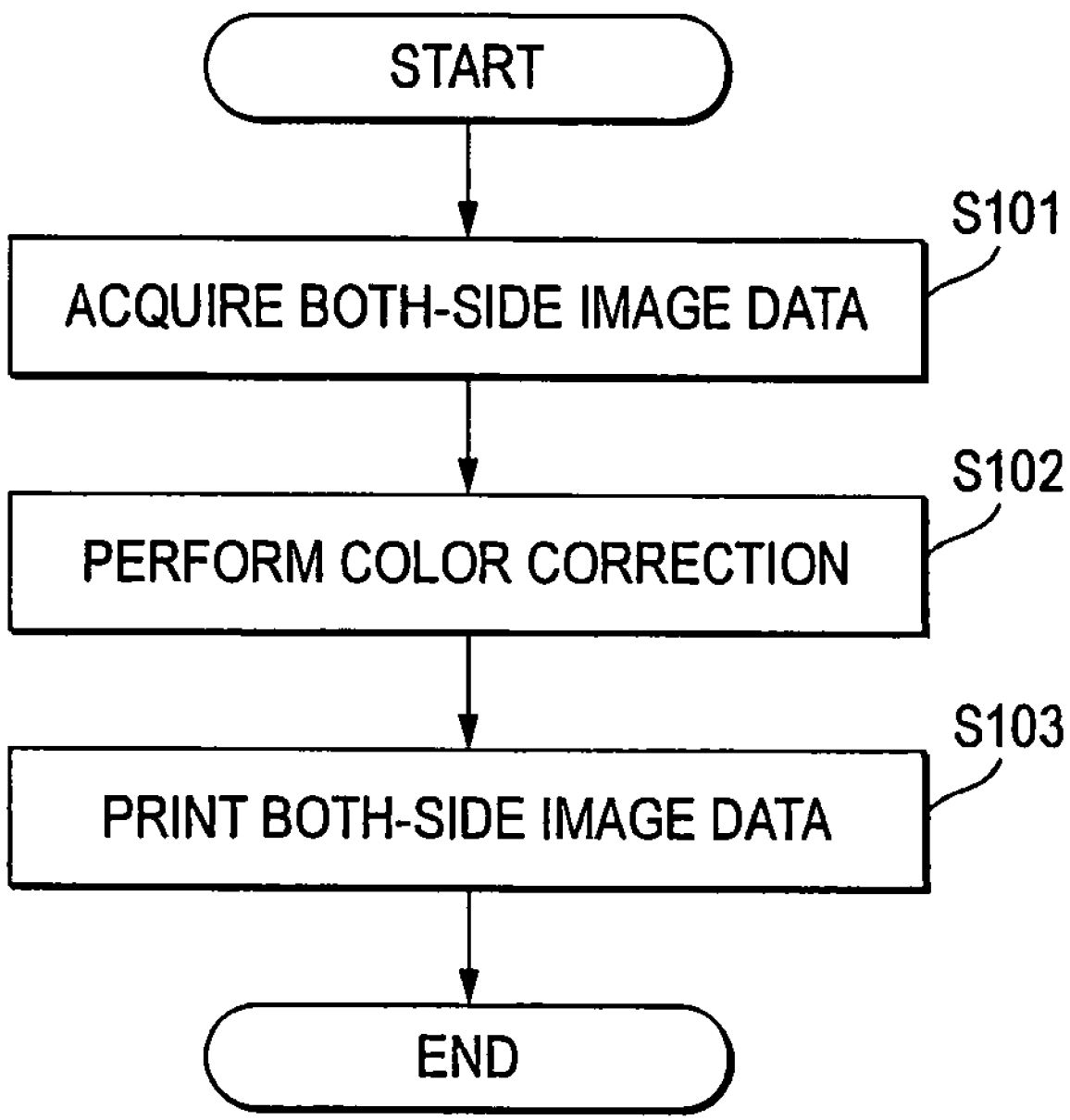
FIG. 2 is a flow chart illustrating an operation of the image forming apparatus to which the exemplary embodiment of the invention is applied.

FIG. 2 is a flow chart illustrating an operation of the image forming apparatus in the exemplary embodiment.

First, the image forming apparatus acquires image data (hereinafter, referred to as "both-side image data") for both-side printing from an image reading device (not shown) or a PC (not shown) (Step 101). That is, color data printed on both side A and side B are acquired together with information on a position where the each color data is printed. In addition, paper information including a thickness of paper used for printing is acquired. The color data and the paper information are transmitted to the image processing unit 85, and the image processing unit 85 performs color correction so as to reduce an influence of a show-through effect by adding the paper information (Step 102). Then, the both-side image data are printed on both sides of paper using the devices such as the first image forming portion 1 and the second image forming portion 2 shown in FIG. 1 (Step 103).

Hereinafter, the color correction process in Step 102 will be described in detail.

First, the functions of the control unit 80 and the image processing portion 85 will be described. In the exemplary embodiment, the image processing unit 85 is provided as an example of a color conversion device.

Figure 3:
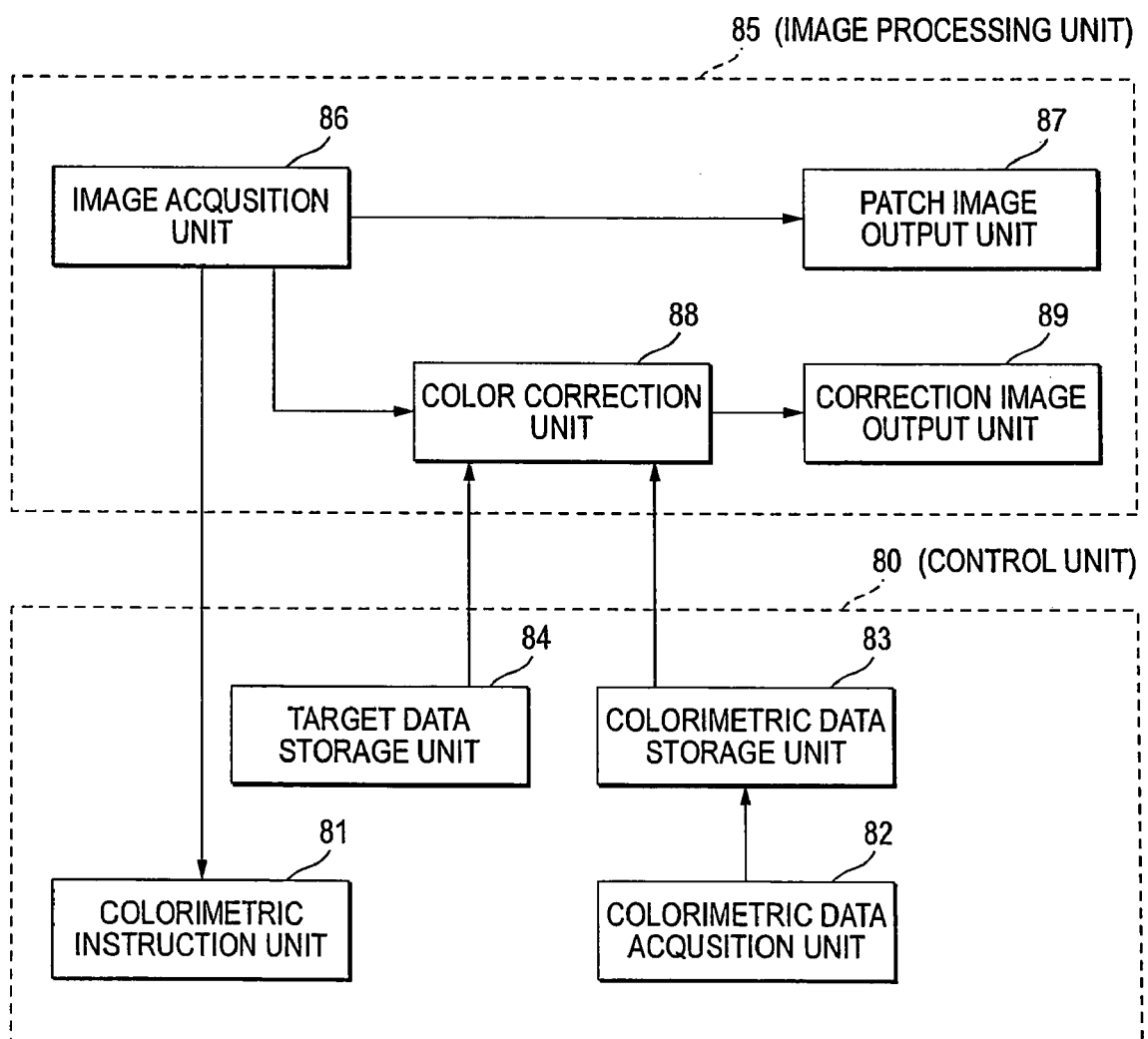
FIG. 3 is a block diagram illustrating a functional configuration of a control unit and an image processing unit according to the exemplary embodiment of the invention.

FIG. 3 is a block diagram illustrating a functional configuration of the control unit 80 and the image processing unit 85.

As shown in FIG. 3, the control unit 80 includes a colorimetric instruction unit 81, a calorimetric data acquisition unit 82, a calorimetric data storage unit 83, and a target data storage unit 84. The image processing unit 85 includes an image acquisition unit 86, a patch image output unit 87, a color correction unit 88, and a correction image output unit 89.

The calorimetric instruction unit 81 instructs the colorimetric sensor 65 to perform colorimetry of the patch images recorded on the paper under the instruction of the image acquisition unit 86.

The calorimetric data acquisition unit 82 acquires a colorimetric data as a result of the colorimetry from the calorimetric sensor 65.

The colorimetric data storage unit 83 stores the calorimetric data acquired by the colorimetric data acquisition unit 82. The calorimetric data is stored to recognize the influence of the show-through effect from the side A to the side B and the show-through effect from the side B to the side A. In the exemplary embodiment, the calorimetric data is used as an example of the show-through effect information for recognizing the influence of such a show-through effect.

The target data storage unit 84 stores a target data as a target of the color conversion. In this case, the target data is stored to prevent the show-through effect from the side A to the side B and the show-through effect from the side B to the side A. That is, in the embodiment, the target data is used as an example of the show-through effect prevention information for preventing such a show-through effect.

The image acquisition unit 86 acquires both-side image data and paper information from an image reading device or a PC (not shown). The both-side image data is acquired as color material gradation data of four colors of C, Y, M, and K after performing the aforementioned various kinds of image processes. That is, in the exemplary embodiment, the image acquisition unit 86 is provided as an example of acquisition section for acquiring color information.

The patch image output unit 87 outputs both-side patch images for measuring the influence of the show-through effect.

The color correction unit 88 performs color correction to the both-side image data acquired by the image acquisition unit 86 in consideration of the influence of the show-through effect. In the exemplary embodiment, the color correction unit 88 is provided as an example of correction section for correcting color information.

The correction image output unit 89 outputs the both-side image data after the color correction unit 88 performs the color correction.

Next, an operation of the control unit 80 and the image processing unit 85 will be described.

Figure 4:
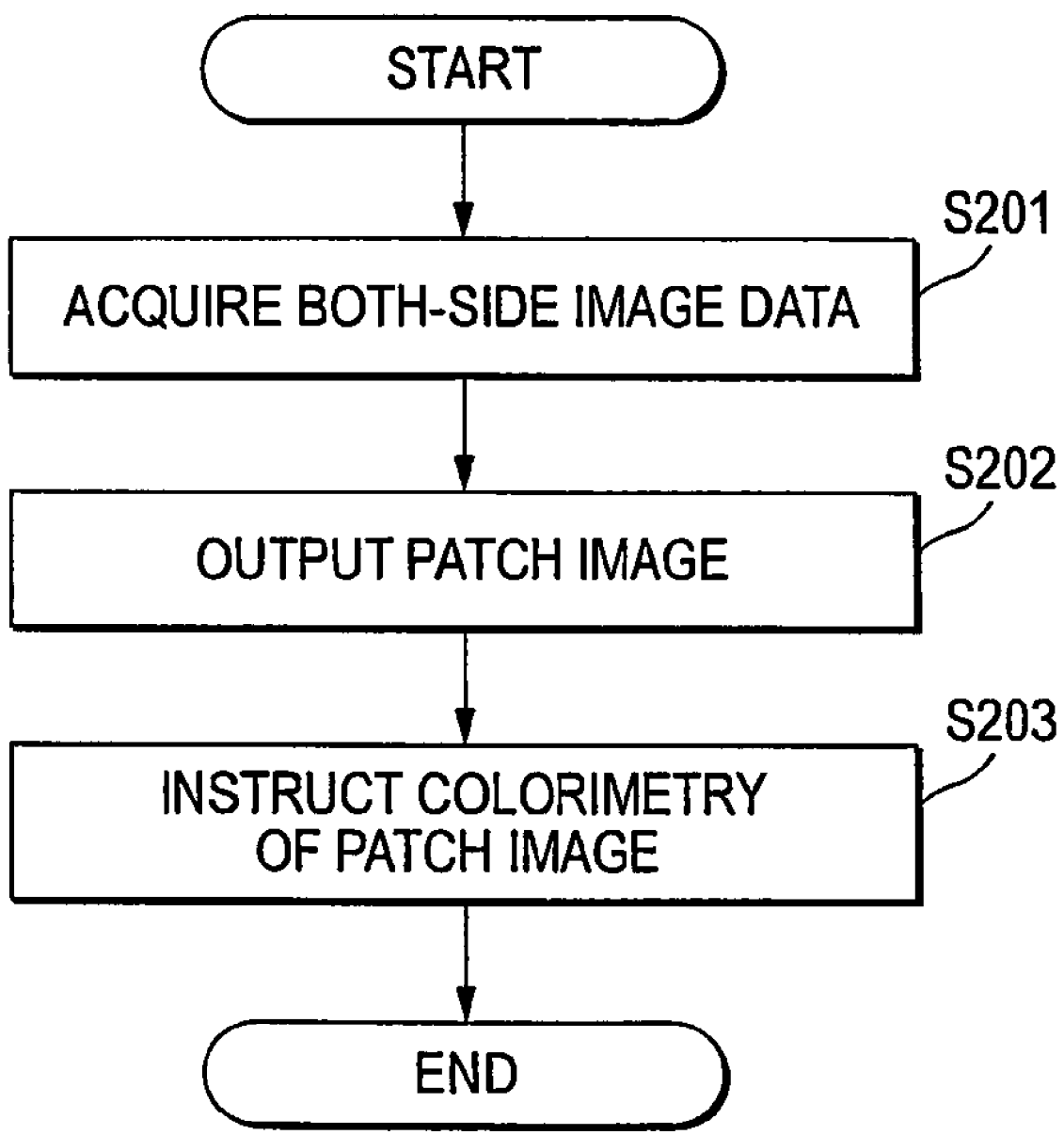
FIG. 4 is a flow chart illustrating an operation example of the control unit and the image processing unit according to the exemplary embodiment of the invention.

FIG. 4 is a flow chart illustrating an operation example of the control unit 80 and the image processing unit 85.

First, the image acquisition unit 86 acquires both-side image data and outputs the both-side image data to the color correction unit 88 (Step 201). The information on the both-side image data acquired by the image acquisition unit 86 is transmitted to the patch image output unit 87. The patch image output unit 87 outputs both-side patch images to the first image forming portion 1 and the second image forming portion 2 to instructs to print the both-side patch images on paper (Step 202). In this case, since the image acquisition unit 86 acquires paper information including a thickness of paper, the patch image output unit 87 receives the paper information and instructs the control unit 80 to print the patch images on the same paper as the paper used for printing according to the paper information. Accordingly, the instructed paper is fed from the paper tray 50 and the instructed both-side patch images are formed in the first image forming portion 1 and the second image forming portion 2 and are printed on the both sides of paper. Information on the both-side image data acquired by the image acquisition unit 86 is also transmitted to the calorimetric instruction unit 81. The calorimetric instruction unit 81 instructs the colorimetric sensor 65 to perform colorimetry from the printed patch images (Step 203).

Here is shown an example of the both-side patch images instructed to be outputted in Step 202.

Figure 5:
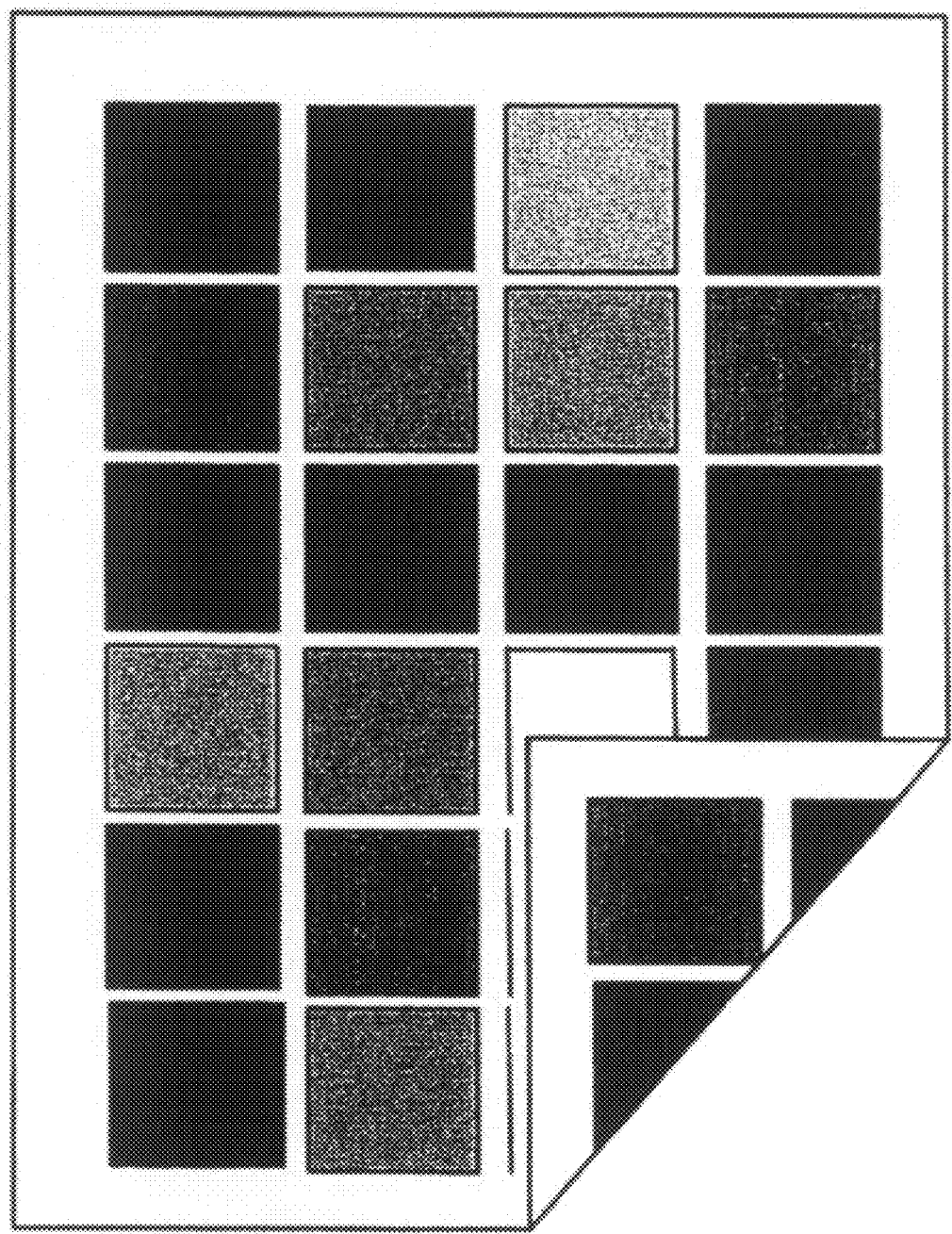
FIG. 5 is a diagram illustrating an example of both-side patch images used in the exemplary embodiment of the invention.

FIG. 5 is a diagram illustrating an example of an output image of the both-side patch images. An object of the both-side patch images is to acquire the influence of the show-through effect. Accordingly, as shown in a folded state in FIG. 5, the patch images are printed on the both sides of paper to overlap with each other. Since it is necessary to reflect characteristics of the image forming apparatus, it is outputted to a color correction target device. In addition, a method of acquiring both-side patch images may be any method that helps to acquire the influence of the show-through effect in the color correction target device.

In the exemplary embodiment, as specific methods of color correction, there are proposed a method of collectively converting colors of opposed pixels of the side A and the side B and a method of alternately converting colors of opposed pixels of the side A and the side B. Hereinafter, the former is referred to as a first operation example and the later is referred to as a second operation example.

FIRST OPERATION EXAMPLE

First, the calorimetric data stored in the calorimetric data storage unit 83 will be described in the first operation example.

FIG. 6 is a diagram illustrating an example of the colorimetric data stored in the first operation example.

In the first operation example, since the CMYK values of the side A and the side B are collectively converted, the calorimetric values about the side A and the side B are also acquired. Specifically, the color data of the patch images outputted in Step 202 is converted into a device-independent color data. In this case, general L*a*b* is exemplified as the device-independent color data in the present specification but is not limited thereto. For example, color data in a color system classified into tristimulus value XYZ, uniform color space, L*u*v*, or the like may be used. Color data represented by polynomial approximation such as (Lab)=F (CMYK), color data represented by Neugebauer, Kubelka-Munk, Lambert-Beer, or the like as physical model expression, or color data converted by ICC profile or the like may be used. That is, anything that can generate a pair of data representing characteristics of the device may be used.

Although not shown, the target data stored in the target data storage unit 84 is also data in which CMYK values of the side A and the side B correspond to calorimetric values (e.g., L*a*b* values) of the side A and the side B. However, the target data is previously acquired, for example, by performing colorimetry of the both-side patch image in which the influence of the show-through effect is reduced as small as possible. Values different from that of the calorimetric data are kept in the target data. In addition, as well as the calorimetric data, the target data may be stored according to types of paper.

Next, a process flow in the first operation example will be described.

Figure 7:
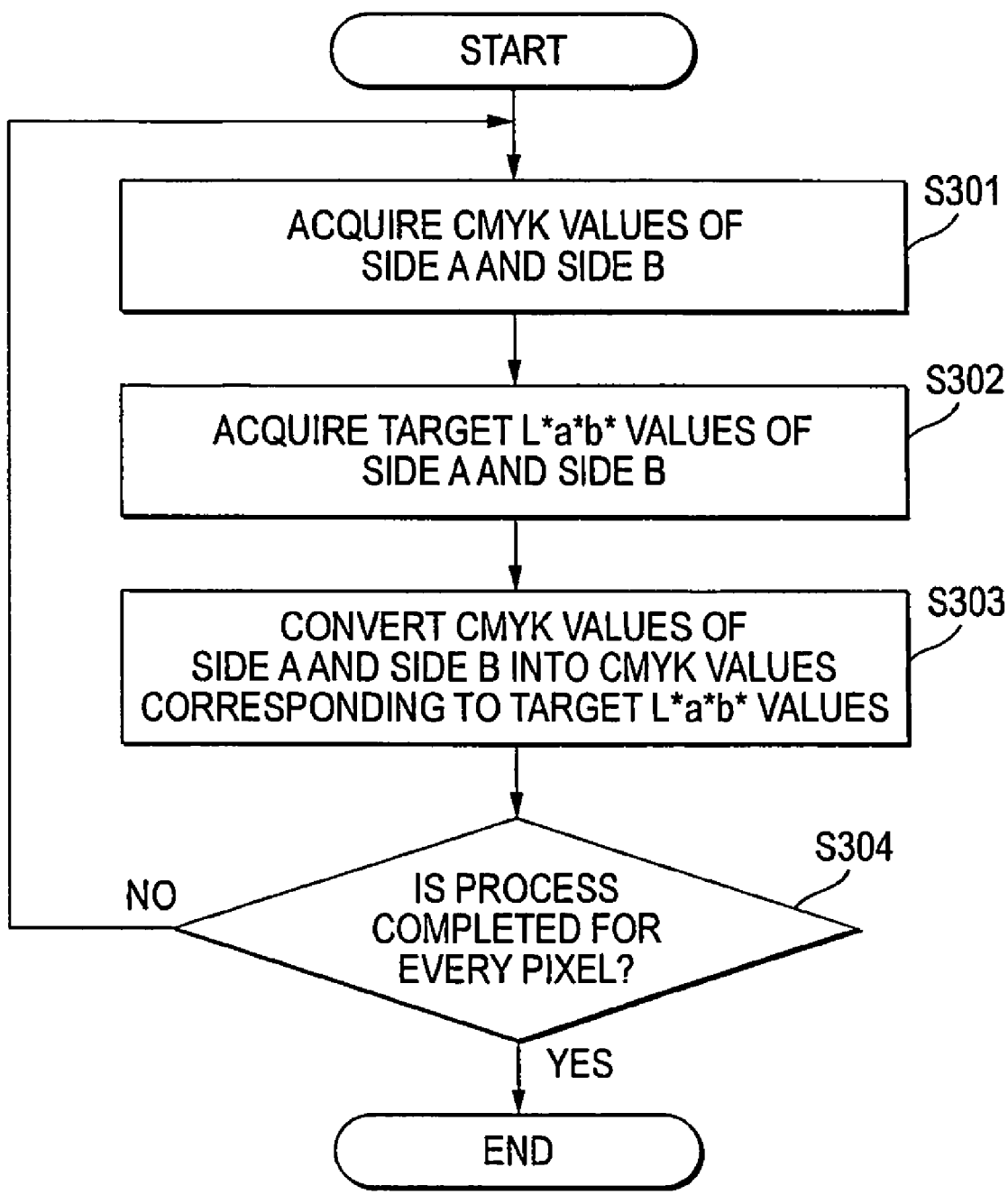
FIG. 7 is a flow chart illustrating the first operation example of the color correction unit according to the exemplary embodiment of the invention.

FIG. 7 is a flow chart illustrating the process flow in the first operation example.

The color correction unit 88 acquires the CMYK values of the side A and the side B from the both-side image data received from the image acquisition unit 86 (Step 301). Then, the color correction unit 88 calculates target L*a*b* values of the side A and the side B with reference to the target data stored in the target data storage unit 84 (Step 302). That is, when the target L*a*b* values are realized, the influence of the show-through effect is small. Then, the color correction unit 88 calculates CMYK values corresponding to the target L*a*b* values with reference to the calorimetric data stored in the calorimetric data storage unit 83 and performs color correction of converting the CMYK values acquired in Step 301 into the CMYK values acquired herein (Step 303).

Finally, the color correction unit 88 judges whether the process is completed for every pixel or not (Step 304). As a result, when there is non-processed pixel, the processes of Steps 301 to 303 are repeated. Alternatively, when there is no non-processed pixel, the process ends.

For example, it is assumed that the color conversion is performed on the corresponding pixels of the both-side image data so that CMYK1 values of the side A are target a color Lab1 and CMYK2 values of the side B is a target color Lab2.

In this case, the color conversion is performed as follow:
CMYK1(CMYK2)→Lab1(Lab2)→CMYK1'(CMYK2').
The method of calculating the Lab values from the CMYK values and the method of calculating the CMYK values from the Lab values are not limited particularly, but regression analysis, high-degree polynomial approximation, neural network, or the like may be used.

The color correction may be performed using DLUT (Direct LookUp Table). In this case, the DLUT is an example of color conversion data uses as reference in color conversion. In the exemplary embodiment, since four colors of C, M, Y, and K is used to represent the colors, a color conversion coefficient of 8-dimensional DLUT is generated.

FIG. 8 shows an example of the 8-dimensional DLUT. The 8-dimensional DLUT is generated based on the colorimetric data (see FIG. 6 for reference) stored in the calorimetric data storage unit 83 and the target data stored in the target data storage unit 84. For example, target L*a*b* values L1, a1, and b1 of the side A and target L*a*b* values L2, a2, and b2 of the side B are calculated from the target data, with respect to CMYK values C1, M1, Y1, and K1 of the side A and CMYK values C2, M2, Y2, and K2 of the side B. Meanwhile, CMYK values C1', M1', Y1', and K1' of the side A and CMYK values C2', M2', Y2', and K2' of the side B are calculated from the target data, with respect to target L*a*b* values L1, a1, and b1 of the side A and target L*a*b* values L2, a2, and b2 of the side B. As a result, the DLUT is generated in which (C1, M1, Y1, K1, C2, M2, Y2, and K2) are converted into (C1', M1', Y1', K1', C2', M2', Y2', and K2'), respectively.

Such a DLUT can be formed with a practical processing time on image application by applying feedback thereto. In addition, the DLUT may be also applied to calibration into hardware and mount of color correction in addition to a software process.

In the exemplary embodiment, the dimension number of DLUT may be reduced to lower the processing cost. In the example of FIG. 8, the DLUT is formed in 8-dimension, in consideration of a general printer formed in 4-dimension of CMYK. However, the DLUT may be formed in 6-dimension, in assumption of a printer formed in 3-dimension. Accordingly, the processing cost is more lowered. Further, the DLUT may be formed in 5-dimension and 4-dimension. However, when the multi-dimensional DLUT is used, 1-dimensional LUT(TRC) of each color of CMY may be provided at the rear stage thereof in addition to the DLUT. As described above, since gradation that becomes a problem due to the DLUT process is compensated, it is possible to perform a color conversion process with high precision.

In addition, the influence of the show-through effect may be specialized by correction of brightness direction to perform the correction of the show-through effect at a higher speed.

SECOND OPERATION EXAMPLE

First, the calorimetric data stored in the calorimetric data storage unit 83 will be described in the second operation example.

FIG. 9 is a diagram illustrating an example of the calorimetric data stored in the second operation example.

In the second operation example, since CMYK values of the side A and the side B are alternately converted, the colorimetric values are acquired only for the side that is a correction target. The specific acquisition method is the same as the first operation example.

Although not shown, the target data stored in the target data storage unit 84 is also data in which CMYK values of the side A and the side B correspond to colorimetric values (e.g., L*a*b* values) of the side A and the side B, in the same manner as the example shown in FIG. 6. Alternatively, the target data may be data in which CMYK values of the side A and the side B may correspond to calorimetric values (e.g., L*a*b* values) of the side A, in the same manner as the example shown in FIG. 9. However, the target data is previously acquired, for example, by reducing the influence of the show-through effect as small as possible and performing colorimetry of the both-side patch image. Values different from that of the colorimetric data are kept in the target data. In addition, the target data may be stored according to types of paper.

Next, a process flow in the second operation example will be described in detail.

Figure 10:
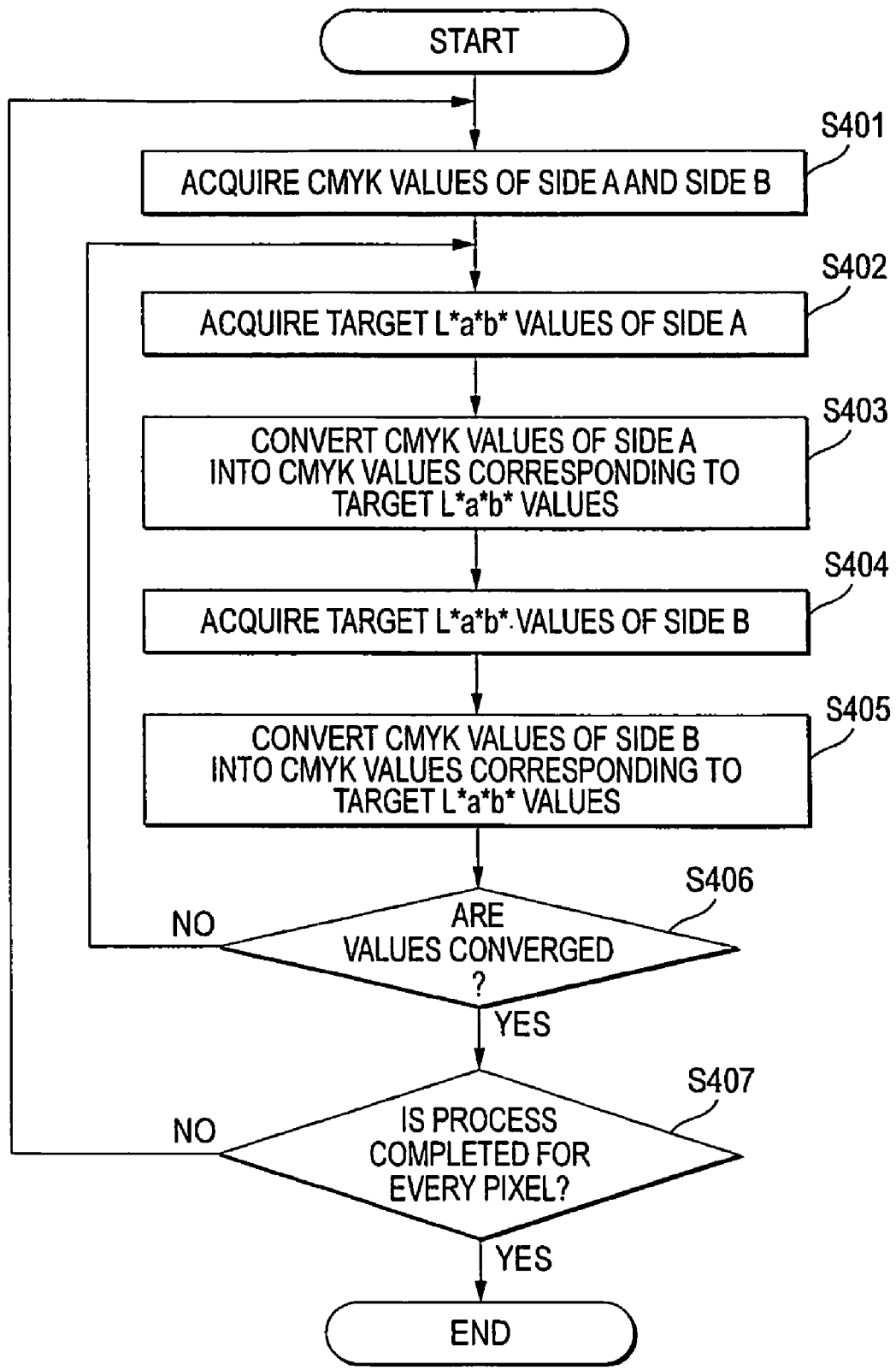
FIG. 10 is a flow chart illustrating the second operation example of the color correction unit according to the exemplary embodiment of the invention.

FIG. 10 is a flow chart illustrating the process flow in the second operation example.

The color correction unit 88 acquires the CMYK values of the side A and the side B from the both-side image data received from the image acquisition unit 86 (Step 401).

Then, the color correction unit 88 calculates target L*a*b* values of the side A with reference to the target data stored in the target data storage unit 84 (Step 402). Then, the color correction unit 88 calculates CMYK values corresponding to the target L*a*b* values with reference to the colorimetric data stored in the calorimetric data storage unit 83 and performs color correction of fixing the CMYK values of the side B and converting the CMYK values of the side A into the CMYK values acquired herein (Step 403).

Subsequently, the color correction unit 88 calculates target L*a*b* values of the side B with reference to the target data stored in the target data storage unit 84 (Step 404). Then, the color correction unit 88 calculates CMYK values corresponding to the target L*a*b* values with reference to the colorimetric data stored in the calorimetric data storage unit 83 and performs color correction of fixing the CMYK values of the side A and converting the CMYK values of the side B into the CMYK values acquired herein (Step 405).

Subsequently, the color correction unit 88 compares the CMYK values of the side B before conversion with the CMYK values of the side B after conversion, and judges whether the values are changed or not (Step 406). As a result, when the CMYK values before conversion are equal to the CMYK value after conversion, it is considered that the values are converged. At this time, the CMYK values are determined as the CMYK values after conversion. When the CMYK values before conversion are different from the CMYK value after conversion, the process returns to Step 402. In this case, the side B is fixed and correction of the side A is performed. This process is repeated until the values are converged in Step 406.

Finally, the color correction unit 88 judges whether the process is completed for every pixel or not (Step 407). As a result, when there is non-processed pixel, the processes of Steps 401 to 406 are repeated. Alternatively, when there is no non-processed pixel, the process ends.

For example, it is assumed that the color conversion is performed on the corresponding pixels of the both-side image data so that CMYK-A values of the side A are target a color Lab-A and CMYK-B values of the side B is a target color Lab-B.

In this case, $$CMYK\text{-}A(CMYK\text{-}B) \rightarrow \text{Lab-}A \rightarrow CMYK\text{-}A'(CMYK\text{-}B) \quad (1)$$

$$CMYK\text{-}A'(CMYK\text{-}B) \rightarrow \text{Lab-}B \rightarrow CMYK\text{-}A'(CMYK\text{-}B') \quad (2)$$

$$\text{IF } (CMYK\text{-}B == CMYK\text{-}B') \quad (3)$$

the repetition of above Formulas is completed and the converged value becomes a correction result.

Else, the process returns to Formula (1), and the process is repeated until Formula (3) is satisfied.

The description of the operation according to the exemplary embodiment is concluded.

The color conversion process in the exemplary embodiment may be realized by a general-purpose computer. Assuming that the color conversion process is realized by the computer 90, a hardware configuration will be described.

Figure 11:
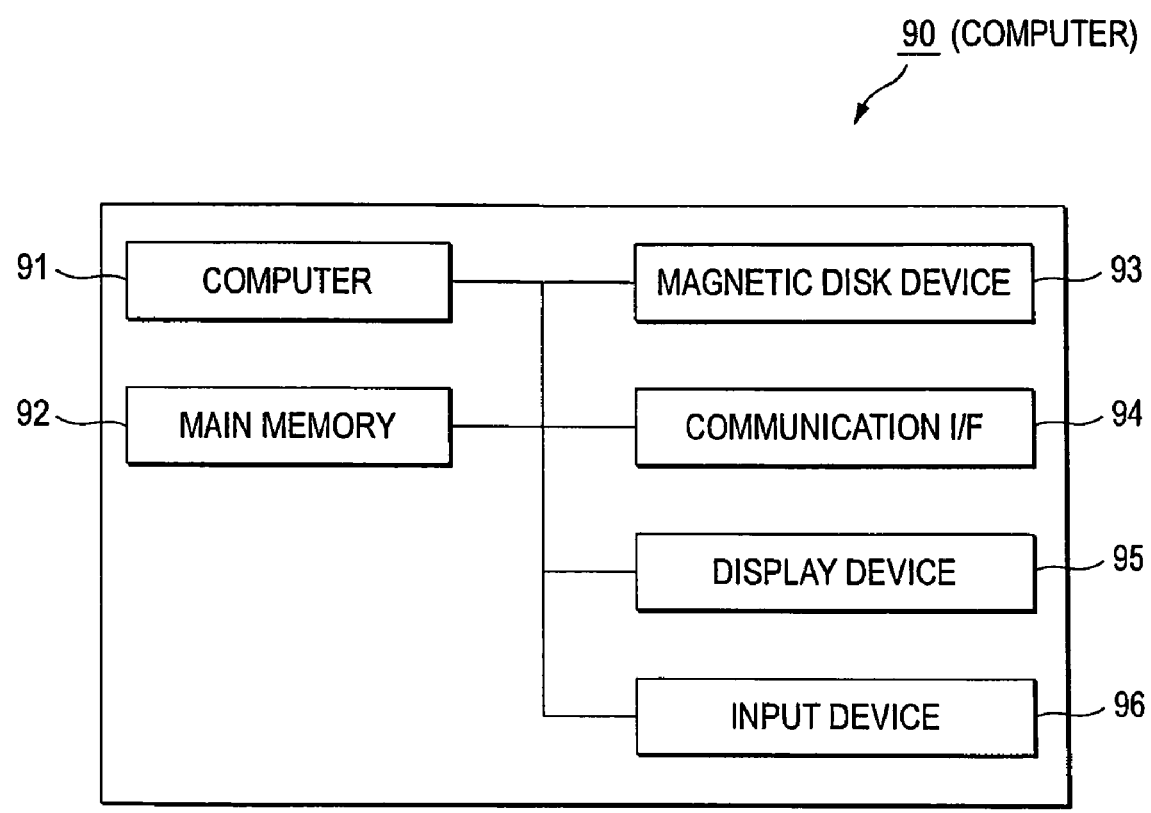
FIG. 11 is a diagram illustrating hardware of a computer to which the exemplary embodiment of the invention is applicable.

FIG. 11 is a diagram illustrating a hardware configuration of the computer 90.

As shown in FIG. 11, the computer 90 includes a CPU (Central Processing Unit) 91, a main memory 92 that is storage means, and magnetic disk device (HDD: Hard Disk Drive) 93. The CPU 91 executes various kinds of software such as OS (Operating System) and application to realize the aforementioned functions. The main memory 92 is a storage area for storing the various kinds of software or data used for the execution thereof. The magnetic disk device 93 is a storage area for storing input data to the various kinds of software or output data from the various kinds of software.

The computer 90 further includes a communication I/F 94 for communicating with the outside, a display device 95 including a video memory or a display, and an input device 96 such as a keyboard and a mouse.

The program for realizing the embodiment may be provided through communication means, and further the program may be stored in a recording medium such as a CD-ROM to provide the program.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

FIG. 1
85: IMAGE PROCESSING UNIT
80: CONTROL UNIT
FIG. 2
S101: ACQUIRE BOTH-SIDE IMAGE DATA
S102: PERFORM COLOR CORRECTION
S103: PRINT BOTH-SIDE IMAGE DATA
FIG. 3
85: IMAGE PROCESSING UNIT
86: IMAGE ACQUISITION UNIT
87: PATCH IMAGE OUTPUT UNIT
88: COLOR CORRECTION UNIT
89: CORRECTION IMAGE OUTPUT UNIT
80: CONTROL UNIT
81: COLORIMETRIC INSTRUCTION UNIT
82: COLORIMETRIC DATA ACQUISITION UNIT
83: COLORIMETRIC DATA STORAGE UNIT
84: TARGET DATA STORAGE UNIT
FIG. 4
S201: ACQUIRE BOTH-SIDE IMAGE DATA
S202: OUTPUT PATCH IMAGE
S203: INSTRUCT COLORIMETRY OF PATCH IMAGE
FIG. 6
SIDE A
SIDE B
COLORIMETRIC VALUE (SIDE A)
COLORIMETRIC VALUE (SIDE B)
FIG. 7
S301: ACQUIRE CMYK VALUES OF SIDE A AND SIDE B
S302: ACQUIRE TARGET L*a*b* VALUES OF SIDE A AND SIDE B
S303: CONVERT CMYK VALUES OF SIDE A AND SIDE B INTO CMYK VALUES CORRESPONDING TO TARGET L*a*b* VALUES
S304: IS PROCESS COMPLETED FOR EVERY PIXEL?
FIG. 8
SIDE A
SIDE B
CORRECTION VALUE OF SIDE A
CORRECTION VALUE OF SIDE B
FIG. 9
COLOR CORRECTION PATCH
SIDE A (CORRECTION TARGET)
SIDE B (NON-CORRECTION TARGET)
COLORIMETRIC VALUE (SIDE A)
FIG. 10
S401: ACQUIRE CMYK VALUES OF SIDE A AND SIDE B
S402: ACQUIRE TARGET L*a*b* VALUES OF SIDE A
S403: CONVERT CMYK VALUES OF SIDE A INTO CMYK VALUES CORRESPONDING TO TARGET L*a*b* VALUES
S404: ACQUIRE TARGET L*a*b* VALUES OF SIDE B
S405: CONVERT CMYK VALUES OF SIDE B INTO CMYK VALUES CORRESPONDING TO TARGET L*a*b* VALUES
S406: ARE VALUES CONVERGED?
S407: IS PROCESS COMPLETED FOR EVERY PIXEL?
FIG. 11
90: COMPUTER
92: MAIN MEMORY
93: MAGNETIC DISK DEVICE
94: COMMUNICATION I/F
95: DISPLAY DEVICE
96: INPUT DEVICE

What is claimed is:

1. A color conversion device comprising:
a processor serving as:
an acquisition section that acquires first color information of an image to be printed on a specific position in a first side of a recording paper and second color information of an image to be printed on a position corresponding to the specific position in a second side of the recording paper; and
a correction section that corrects the first color information and second color information acquired by the acquisition section, based on combination information on color combination of images on the corresponding positions of the first side and the second side, wherein
if color transition between the second color information before a current correcting was performed and the second color information after the current correcting is performed is not converged, the correction section corrects the first color information and the second color information again.

2. The color conversion device according to claim 1, wherein the combination information includes show-through effect information for recognizing influences of a show-through effect from the first side to the second side and a show-through effect from the second side to the first side.

3. The color conversion device according to claim 2, wherein the show-through effect information includes information obtained from patch images printed to overlap on the both sides of the recording paper.

4. The color conversion device according to claim 1, wherein the combination information includes show-through effect restraint information for restraining a show-through effect from the first side to the second side and a show-through effect from the second side to the first side.

5. The color conversion device according to claim 1, wherein the combination information includes color conversion information used as reference in color conversion of the respective sides of the first side and the second side.

6. The color conversion device according to claim 5, wherein the combination information includes a 8-dimensional table storing correspondence between information of cyan, magenta, yellow, and black on the first side and information of cyan, magenta, yellow, and black on the second side.

7. The color conversion device according to claim 6, wherein the color conversion information includes information for correcting gradation of at least one color of cyan, magenta, yellow, and black.

8. The color conversion device according to claim 1, wherein the correction section collectively corrects the first color information and the second color information.

9. The color conversion device according to claim 1, wherein the combination information that is previously associated to types of the recording paper.

10. The color conversion device according to claim 1, further comprising:
a storage device that stores target values which are values in a uniform color space, wherein
the correction section converts the first color information and the second color information into values in the uniform color space and then corrects the converted first color information and the converted second color information to the target values.

11. A non-transitory computer readable medium storing a computer readable program for causing a computer to execute a process for color conversion, the process comprising:
acquiring first color information of an image to be printed on a specific position in a first side of a recording paper and second color information of an image to be printed on a position corresponding to the specific position in a second side of the recording paper;
correcting the acquired first color information and second color information, based on combination information on color combination of images on the corresponding positions of the first side and the second side; and
if color transition between the second color information before a current correcting was performed and the second color information after the current correcting is performed is not converged, correcting of the first color information and the second color information again.

12. The non-transitory computer readable medium according to claim 11,
wherein the combination information includes show-through effect information for recognizing influences of a show-through effect from the first side to the second side and a show-through effect from the second side to the first side.

13. The non-transitory computer readable medium according to claim 11,
wherein the combination information includes show-through effect restraint information for restraining a show-through effect from the first side to the second side and a show-through effect from the second side to the first side.

14. The non-transitory computer readable medium according to claim 11, wherein
target values which are values in a uniform color space are stored in a storage device, wherein
the correcting includes
converting the first color information and the second color information into values in the uniform color space, and
correcting the converted first color information and the converted second color information to the target values.

15. An information processing method comprising:
acquiring first color information of an image to be printed on a specific position in a first side of a recording paper and second color information of an image to be printed on a position corresponding to the specific position in a second side of the recording paper;
correcting, by a processor, the acquired first color information and second color information, based on combination information on color combination of images on the corresponding positions of the first side and the second side; and
if color transition between the second color information before a current correcting was performed and the second color information after the current correcting is performed is not converged, correcting of the first color information and second color information again.

16. The information processing method according to claim 15,
wherein the combination information includes show-through effect information for recognizing influences of a show-through effect from the first side to the second side and a show-through effect from the second side to the first side.

17. The information processing method according to claim 15, wherein the combination information includes show-through effect restraint information for restraining a show-through effect from the first side to the second side and a show-through effect from the second side to the first side.

18. The information processing method according to claim 15, wherein
target values which are values in a uniform color space are stored in a storage device, wherein
the correcting includes
converting the first color information and the second color information into values in the uniform color space, and
correcting the converted first color information and the converted second color information to the target values.

19. A color conversion device comprising:
a processor serving as
an acquisition section that acquires first color information of an image to be printed on a specific position in a first side of a recording paper and second color information of an image to be printed on a position corresponding to the specific position in a second side of the recording paper, and
a correction section that corrects the first color information and second color information acquired by the acquisition section, based on combination information on color combination of images on the corresponding positions of the first side and the second side; and
a storage device that stores target vales which are values in a uniform color space, wherein
the correction section converts the first color information and the second color information into values in the uniform color space and then corrects the converted first color information and the converted second color information to the target values.

* * * * *